United States Patent
Malek et al.

(10) Patent No.: US 11,130,099 B2
(45) Date of Patent: Sep. 28, 2021

(54) POLYAMIDE FLAT SHEET MEMBRANES WITH MICROPOROUS SURFACE STRUCTURE FOR NANOPARTICLE RETENTION

(71) Applicant: 3M INNOVATIVE PROPERTIES COMPANY, St. Paul, MN (US)

(72) Inventors: Daniel Malek, Wuppertal (DE); Walter Stripp, Sulzbach am Main (DE); Martin Czernik, Wuppertal (DE); Ramona Osterloh, Velbert (DE); Frank Schneider, Wuppertal (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/624,588

(22) PCT Filed: Jun. 25, 2018

(86) PCT No.: PCT/US2018/039251
§ 371 (c)(1),
(2) Date: Dec. 19, 2019

(87) PCT Pub. No.: WO2019/005656
PCT Pub. Date: Jan. 3, 2019

(65) Prior Publication Data
US 2020/0129933 A1 Apr. 30, 2020

(30) Foreign Application Priority Data
Jun. 28, 2017 (EP) .................................... 17178506

(51) Int. Cl.
*B01D 71/56* (2006.01)
*B01D 61/02* (2006.01)
(Continued)

(52) U.S. Cl.
CPC .......... *B01D 71/56* (2013.01); *B01D 61/027* (2013.01); *B01D 61/145* (2013.01);
(Continued)

(58) Field of Classification Search
CPC ................ B01D 61/027; B01D 61/145; B01D 67/0011; B01D 67/0013; B01D 69/02;
(Continued)

(56) References Cited

U.S. PATENT DOCUMENTS

| 4,594,207 A | 6/1986 | Josefiak |
| 4,595,503 A | 6/1986 | Schindler |

(Continued)

FOREIGN PATENT DOCUMENTS

| DE | 2737745 | 3/1978 |
| EP | 0413552 | 2/1991 |
| EP | 1932581 | 6/2008 |

OTHER PUBLICATIONS

Kesting, Synthetic Polymeric Membranes, 261-264 (1985).
(Continued)

*Primary Examiner* — Krishnan S Menon
(74) *Attorney, Agent, or Firm* — 3M Innovative Properties Company (57) ABSTRACT

The present disclosure provides a flat-sheet polyamide membrane comprising a first major surface and a second major surface and a separation layer and a porous substructure in the cross section of the membrane between the first major and the second major surface, wherein the average pore size diameter in the separation layer is smaller than the average pore size diameters on the first and second major surfaces, wherein the average pore size diameter on the first major surface is larger than the average pore size diameter on the second major surface, wherein the separation layer is closer to the second major surface than to the first major surface.

(Continued)

The present disclosure further provides a method for producing such membranes and a use of the membranes for nanofiltration or ultrafiltration purposes.

13 Claims, 3 Drawing Sheets

(51) Int. Cl.
    *B01D 61/14*     (2006.01)
    *B01D 67/00*     (2006.01)
    *B01D 69/02*     (2006.01)
    *B01D 69/06*     (2006.01)

(52) U.S. Cl.
    CPC ...... *B01D 67/0011* (2013.01); *B01D 67/0013* (2013.01); *B01D 67/0016* (2013.01); *B01D 67/0018* (2013.01); *B01D 69/02* (2013.01); *B01D 69/06* (2013.01); *B01D 2323/08* (2013.01); *B01D 2323/12* (2013.01); *B01D 2325/023* (2013.01)

(58) Field of Classification Search
    CPC ................ B01D 69/06; B01D 2323/08; B01D 2323/12; B01D 2325/023; B01D 2325/02; B01D 71/56; B01D 67/0016; B01D 67/0018
    See application file for complete search history.

(56) References Cited

U.S. PATENT DOCUMENTS

| | | |
|---|---|---|
| 7,201,860 B2 | 4/2007 | Wechs |
| 2003/0159984 A1 | 8/2003 | Wechs |
| 2003/0209486 A1 | 11/2003 | Kools |
| 2016/0256836 A1 | 9/2016 | Bonyadi |

OTHER PUBLICATIONS

1507 Extended EP Search Report for EP17178506.6, dated Dec. 18, 2017, 7pgs.

International Search Report for PCT International Application No. PCT/US2018/039251, dated Sep. 20, 2018, 4 pages.

POLYAMIDE FLAT SHEET MEMBRANES WITH MICROPOROUS SURFACE STRUCTURE FOR NANOPARTICLE RETENTION

CROSS REFERENCE TO RELATED APPLICATIONS

This application is a national stage filing under 35 U.S.C. 371 of PCT/US2018/039251, filed Jun. 25, 2018, which claims the benefit of EP Patent Application No. 17178506.6, filed Jun. 28, 2017, the disclosures of which are incorporated by reference in their entirety herein.

FIELD

The present disclosure relates to microporous polyamide flat sheet membranes. In addition, the present disclosure relates to a process for producing such membranes. The present disclosure further relates to use of such membranes for filtration and purification of liquid media.

BACKGROUND

Polyamide membranes have found various applications where filtration and/or purification of liquid media play a particular role. Typical applications are as ultrafiltration or microfiltration membranes in the food and beverages industry, as well as in the pharmaceutical industry. A further significant application of membranes such as polyamide membranes is the electronics industry, where purification of liquid media is of high importance. In particular, high purity solvents are required in the semiconductor industry such as in the manufacture of processors and chips for the ever-growing smartphone sector. Since the trend clearly goes forward to smaller node widths, the acceptable particle size in solvents used in manufacturing processes has also to decrease. Accordingly, there is a need for high-performance membranes suitable for this purposes, as well as for new methods of manufacturing such membranes.

Polyamide membranes for filtration purposes and methods for manufacturing purposes are known in the art. For instance, US 2016/0256836 A1 describes microporous polyamide membranes derived from a non-solvent-induced phase-separation process.

The membranes are asymmetric and exhibit a tight layer having a thickness of less than 10 µm on of their major surfaces. One embodiment described in this publication is a polyamide membrane having a HFE bubble point from about 25 psi to about 200 psi and an IPA flow-time from about 400 seconds to about 40,000 seconds Another exemplary state of the art publication is US 2003/0159984 A1 which describes a method for producing polyamide membranes which comprises shaping a shaped object from a polyamide solution in a die and cooling of this shaped object with a cooling medium having a specific temperature. The membranes obtained therefrom are described as polyamide membranes having improved hydrolytic stability.

SUMMARY

The present disclosure provides a flat-sheet polyamide membrane comprising a first major surface and a second major surface and a separation layer and a porous substructure in the cross section of the membrane between the first major and the second major surface, wherein the average pore size diameter in the separation layer is smaller than the average pore size diameters on the first and second major surfaces, wherein the average pore size diameter on the first major surface is larger than the average pore size diameter on the second major surface, wherein the separation layer is closer to the second major surface than to the first major surface.

The present disclosure further provides producing a membrane, comprising the steps
(i) Providing a homogeneous casting solution comprising a polyamide and a solvent system, wherein the casting solution of the polymer component and solvent system has on cooling a critical demixing temperature and a solidification temperature, and a miscibility gap below the critical demixing temperature in the liquid state of aggregation, and wherein the solvent system contains a component A and a component B, which are liquid and can be mixed homogeneously with each other at the dissolving temperature, and wherein a solvent for the polymer component is selected from component A and component B is a non-solvent for the polymer component;
(ii) Forming of the casting solution into a film having a first major surface and a second major surface in a forming tool having a temperature above the critical demixing temperature of the casting solution;
(iii) Placing the second major of the film onto a conditionable carrier, which is conditioned to a cooling temperature below the solidification temperature, resulting in cooling of the film via the conditionable carrier at such a rate that a thermodynamic non-equilibrium liquid-liquid phase separation into a polymer-rich and a polymer-poor phase takes place, and subsequently, on passing below the solidification temperature, solidification of the polymer-rich phase takes place, forming a membrane structure; at the same time;
(iv) Bringing the first major surface of the film into contact with a gaseous atmosphere,
(v) Placing the film into a precipitation bath comprising a non-solvent for the polyamide polymer, thereby forming the three-dimensional porous membrane structure, characterized in that
the conditionable carrier is conditioned to a temperature in the range of from 5 to 45° C.;
and wherein the film has a residence time on the conditionable carrier from being casted onto the conditionable carrier until entry into the precipitation bath of at least 10 s.

Furthermore, the present disclosure relates to certain uses in applications in nanofiltration or ultrafiltration, in particular in purification of liquid media for semiconductor manufacturing processes.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by % by weight (or "% wt". or "wt.-%") unless specified otherwise. The amounts of all ingredients gives 100% wt unless specified otherwise. If the amounts of ingredients is identified by % mole the amount of all ingredients gives 100% mole unless specified otherwise.

Unless explicitly indicated, all preferred ranges and embodiments may be combined freely.

The present disclosure provides a flat-sheet polyamide membrane comprising a first major surface and a second major surface and a separation layer and a porous substructure in the cross section of the membrane between the first major and the second major surface, wherein the average pore size diameter in the separation layer is smaller than the average pore size diameters on the first and second major surfaces, wherein the average pore size diameter on the first major surface is larger than the average pore size diameter on the second major surface, wherein the separation layer is closer to the second major surface than to the first major surface.

This structure, i.e. the combination of having a separation layer having smaller average pore diameters than both of first and second surfaces, leads to a combination of filtration features such as high retention of particles while still exhibiting a good water permeability, i.e. high flux rate, and high throughput expressed as transmembrane flow. Moreover, this structure may offer the additional advantage of deep bed filtration, i.e. a good dirt hold capacity. Additionally, the location of the separation layer in the cross-section of the membrane between first and second major surfaces offers further advantages. In particular, the separation layer is unaffected when the membrane is damage at one of its surfaces. Likewise, the separation layer is protected during pleating processes. These combination of advantages may be particularly desirable and advantageous for applications in the manufacture of semiconductor electronics.

Generally, the membranes according to the present disclosure are porous polyamide flat-sheet membranes having a first major surface and a second major surface and a separation layer as well as a porous substructure in the cross section between the first and second major surfaces. The flat-sheet membranes as described herein preferably exhibit a thickness in the range of from 100 to 300 µm. A preferred thickness is in the range of 200 to 300 µm. Membranes having thicknesses in these preferred ranges may exhibit particular advantageous particle adsorption properties due to their porous structure and the particular porosity and pore sizes on their first and second major surfaces. This makes them particularly suitable for applications in purification of aqueous process media in electronics and semiconductor manufacturing processes, in particular in the generation of ultrapure water.

The membranes as described herein are polyamide membranes. The polyamides normally used for polyamide membranes are suitable for use as the polyamide constituting the membrane of the present disclosure or as the polyamide used in the method of the present disclosure. Thus polyamide homopolymers like polyamide-6, polyamide-6,6, polyamide-6,1 or polyamide-4,6, polyamide-11 or polyamide-12, and also polyamide copolymers such as those based on polyamide-6, 12 can be used. The number average molecular weight of the polyamides used in the method of the invention lies preferably between 20000 and 60000 Daltons. Polyamides of this type show a relative solution viscosity (SV), as determined by the method described in the experimental section, of between 2.5 and 5. Additionally, in the context of the present invention, polyamides of high thermal stability are preferred, which allow superheated steam sterilisation of the polyamide membrane formed from them at temperatures of at least 130° C. without any change in the membrane structure. For the present invention, polyamide-6 is especially preferred as the polymer constituting the membrane. Examples of commercially available polyamide-6 include the Ultramid series (from BASF, Ludwigshafen) such as Utramid B40LN and AKULON F 136E (from DSM).

Preferably, the maximum of the pore size distribution in the separation layer is in the range of from 5 to 50 nm. This maximum of the pore size distribution is determined in the present disclosure according to ASTM F316-03 (Issue 2007) using isopropyl alcohol (IPA) as solvent. A maximum of the pore size distribution within these limits may give rise to a filtration performance desirable in nanofiltration and ultrafiltration, in particular where high purification of liquid media and in particular aqueous media such as water is desirable or necessary. It is preferred that the maximum of the pore size distribution in the separation layer is in the range of from 30 to 45 nm, preferably from 30 to 40 nm. It is further advantageous and therefore preferred that the maximum of the pore size distribution according to ASTM F316-03 is in the range of from 20 to 50 nm.

It is assumed that the surface pores also influence the capillary forces in the membrane when it is wetted with aqueous liquids.

It is further preferred that the surface porosity on the first major surface is larger than the surface porosity on the second major surface. The surface porosity may be described as the ration or percentage of pores to polyamide matrix and may be given in %. Preferably, the surface porosity as used herein is determined in optical processes, in particular of analyzing pictures of the surfaces obtained by scanning electron microscopy (SEM). In this regard, magnifications of the first major surfaces of 2000× may be used, whereas magnifications of the second major surfaces of 8000× or even 20000× may be suitable. Preferably, the membrane according to this disclosure has a surface porosity on the first major surface of at least 20%, preferably of at least 25%, and more preferably of at least 30%. Similarly, it is preferred that the surface porosity on the second major surface of the membranes as described herein is at least 15%, and preferably at least 20%.

In this regard, it is preferred that the first major surface, when examined with SEM (preferably at 8000× or even 20000× magnification), has a filamentous, network-like structure. This is opposed to a so-called sea-island structure in which uniform, on average approximately oval or circular-shaped openings in the surfaces thus form islands in the cover layer and are respectively surrounded by cover layer material. It is also preferred that the same applies to the second major surface of the membranes as described herein.

The pore diameters of the first and second major surfaces may also be determined by visual analyzation of SEM pictures of the surfaces. The same magnifications may be used as described for the surface porosity. From the pore diameters obtained, the average pore diameters are determined as known in the art. Preferably, the ratio of the average pore diameters on the second major surface to the average pore diameters on the first major surface of the membranes according to the present disclosure is at least 1:3, preferably at least 1:5, more preferably at least 1:7. Moreover, it is preferred that the ratio of the average pore diameter on the second major surface to the average pore diameter of the first major surface of the membranes as described herein is less than 1:10, preferably less than 1:9, more preferably less than 1:8. In this regard, the average pore diameter on the first major surface is at least 0.5 µm, preferably at least 0.7 µm, and more preferably at least 1 µm. Furthermore, it is preferred that the average pore diameter on the second major surface is at least 0.05 µm, preferably at least 0.1 µm, and more preferably at least 0.15 µm. It is further preferred that the average pore diameter on the second major surface is less than 0.3 µm, preferably less than 0.25 µm, and more preferably less than 0.2 µm.

It is further preferred that the membranes according to the present disclosure exhibit a volume porosity of at least 70%, preferably of at least 75%, and more preferably of at least 77.5%. It is also preferred that the volume porosity is less than 90%, preferably less than 85%, and more preferably less than 83%. Generally, it is preferred that the membranes as described herein exhibit a volume porosity in the range of from 70 to 90%. Furthermore, it is preferred that the membrane is substantially free from macrovoids. Macrovoids may be disadvantageous since they may have detrimental influence on either or both the membrane strength and the filtration properties. In addition, it is preferred that the membrane wall, starting from the separation layer in direction to the first major surface, comprises an asymmetric region over at least 80% of the wall thickness.

The diameter of the maximum separation pore of the membranes (dmax) as described herein are generally determined by measuring the bubble point with isopropyl alcohol (IPA) as described below in the experimental section. Preferably, the membranes according to the present disclosure exhibit a dmax as determined with bubble point IPA of at least 0.01 µm, preferably of at least 0.02 µm, and more preferably of at least 0.03 µm. It is further preferred that the membranes as described herein exhibit a dmax as determined with bubble point IPA of less than 0.12 µm, more preferably of less than 0.1 µm, and more preferably of less than 0.09 µm.

Since the membranes according to the present invention are generally suited for purification of liquid media, in particular aqueous media such as particular water, the transmembrane flow is of particular importance and is generally determined as the transmembrane flow of water, i.e. the water permeability. Generally, the transmembrane flow as described herein is determined as described below in the experimental section. Preferably, the transmembrane flow of the membranes according to the present disclosure is in the range of from 0.1 to 10 mL/(min·cm²·bar), preferably in the range of from 0.5 to 8 mL/(min·cm²·bar), more preferably in the range of from 1 to 3 mL/(min·cm²·bar). One preferred transmembrane flow is in the range of from 1 to 5 mL/(min·cm²·bar). Another preferred transmembrane flow is in the range of from 0.5 to 3 mL/(min·cm²·bar). A further preferred transmembrane flow is in the range of from 0.1 to 2 mL/(min·cm²·bar). Thus, the membranes as described herein exhibit a high flux, i.e. water permeability, while also having small pores in the separation layer, giving rise to a high retention of particles in the nanofiltration range.

The present disclosure further provides method for producing a membrane, comprising the steps
(i) Providing a homogeneous casting solution comprising a polyamide and a solvent system, wherein the casting solution of the polymer component and solvent system has on cooling a critical demixing temperature and a solidification temperature, and a miscibility gap below the critical demixing temperature in the liquid state of aggregation, and wherein the solvent system contains a component A and a component B, which are liquid and can be mixed homogeneously with each other at the dissolving temperature, and wherein a solvent for the polymer component is selected from component A and component B is a non-solvent for the polymer component;
(ii) Forming of the casting solution into a film having a first major surface and a second major surface in a forming tool having a temperature above the critical demixing temperature of the casting solution;
(iii) Placing the second major of the film onto a conditionable carrier, which is conditioned to a cooling temperature below the solidification temperature, resulting in cooling of the film via the conditionable carrier at such a rate that a thermodynamic non-equilibrium liquid-liquid phase separation into a polymer-rich and a polymer-poor phase takes place, and subsequently, on passing below the solidification temperature, solidification of the polymer-rich phase takes place, forming a membrane structure; at the same time;
(iv) Bringing the first major surface of the film into contact with a gaseous atmosphere,
(v) Placing the film into a precipitation bath comprising a non-solvent for the polyamide polymer, thereby forming the three-dimensioned porous membrane structure, characterized in that
the conditionable carrier is conditioned to a temperature in the range of from 5 to 45° C.;
and wherein the film has a residence time on the conditionable carrier from being casted onto the conditionable carrier until entry into the precipitation bath of at least 10 s.

With the method according as described herein, porous polyamide flat-sheet membranes according to the present disclosure having the advantageous structure and properties may be obtained.

The method according to the present disclosure is based on a thermally induced phase separation process with liquid-liquid phase separation. According to the present disclosure, the polymer component and the solvent system together form a binary system, which in the liquid state shows a range where it exists as a homogeneous solution and another in which it has a miscibility gap. If such a system is cooled from the range where it exists as a homogeneous solution to below the critical demixing temperature or phase separation temperature, a liquid-liquid demixing or phase separation into two liquid phases, a polymer-rich and a polymer-poor phase, first occurs. Further cooling to a temperature below the solidification temperature causes the polymer-rich phase to solidify into a three-dimensional membrane structure. The cooling rate, together with the polymer concentration, has an appreciable influence on the pore structure formed. If cooling rate is sufficiently high that the liquid-liquid phase separation cannot occur under thermodynamic equilibrium conditions but under thermodynamic non-equilibrium conditions, but is nevertheless relatively slow, the liquid-liquid phase separation occurs approximately concurrently with the formation of a large number of liquid droplets of essentially the same size. The resulting polymeric structure then has a sponge-like, cellular and open-pored microstructure. If the cooling rate is significantly higher, the polymer solidifies before most of the liquid droplets can develop. Network-like microstructures are then formed. The various types of formation of such sponge-like microporous structures by processes involving thermally induced liquid-liquid phase separation are described in detail in DE-A 27 37 745, to the disclosure of which reference is hereby explicitly made, and presented in, e.g., R. E. Kesting's Synthetic Polymeric Membranes, John Wiley & Sons, 1985, pp. 261-264.

In the first step of the method, a homogeneous casting solution comprising a polyamide and a solvent system is provided. The casting solution of the polymer component and solvent system has on cooling a critical demixing temperature and a solidification temperature, and a miscibility gap below the critical demixing temperature in the liquid state of aggregation. The solvent system as described herein contains a component A and a component B, which are liquid and can be mixed homogeneously with each other at the dissolving temperature, and wherein a solvent for the polymer component is selected from component A and component B is a non-solvent for the polymer component, a solvent which does dissolve the polyamide, but the dissolving temperature of which relative to the polyamide is at least 50° C., preferably at least 100° C. higher than the dissolving temperature of component A relative to the polyamide, or component B is a swelling agent for the polyamide. A non-solvent is understood here as a compound that does not dissolve the polyamide to a homogeneous solution in a concentration of 1% by weight in the non-solvent on heating to no higher than the boiling point of this non-solvent. Preferably the component B is a non-solvent for the polymer, i.e. polyamide component. It is also preferred that the solvent system is water soluble. Preferably, diglycerol, glycerol, glycol, diglycol, glyceryl monoacetate, caprolactam or butyrolactone are used as component A and polyethylene glycols of various molecular weight are preferably used as component B. Particularly good results are obtained with solvent systems consisting of a mixture of diglycerol and a polyethylene glycol, or with those containing a mixture of caprolactam and butyrolactone as compound A and a polyethylene glycol or glyceryl triacetate as compound B. Further particularly advantageous is the use of a solvent system comprising diglycerin as component A and a polyethylene glycol (PEG), preferably PEG 600, as component B. It is also advantageous to include the component A in a higher amount than component B, in particular in a certain ratio. Preferably, the ratio of at least one component A to at least one component B is greater than 50:1, preferably greater than 70:1, more preferably greater than 90:1, even more preferably greater than 99:1. Moreover, it is preferred that the casting solution comprises the polyamide in an amount of from 10 to 25 wt.-%, preferably from 10 to 17 wt.-%, more preferably from 12 to 15 wt.-%.

It is understood that the polyamide used in the method as described herein are the same as described for the membrane according to the present disclosure. The polyamide membrane may further contain at least one stabilizer. This may result in polyamide membranes having improved hydrolytic stability, giving rise to a longer service life and higher stability to superheated steam sterilisation compared to known polyamide membranes, for the above-mentioned applications in contact with aqueous media at high temperatures. Preferably, stabilizers are selected from antioxidant agents or antioxidants known in the art. Particular reference is made to the antioxidants mentioned in [0043] and [0044] of US 2003/0159984 A1, the disclosure of which is incorporated herein by reference. The antioxidant agents contained in the membrane or used in the method as described herein are preferably essentially insoluble in water. The upper limit of solubility is considered to be 0.01 g/100 g of water at 20° C. The appearance of the polyamide membrane, e.g., the colour, should not be affected by the antioxidant agent With regard to the application of the antioxidants in the membranes and the method according to the present disclosure, further reference is made to [0045], [0046] and [0047] of US 2003/0159984 A1, the disclosures of which are incorporated herein by reference. If required, further substances such as nucleation agents, UV absorbers, fillers and even processing auxiliaries (to increase viscosity) or similar substances may be added as additives to the polymer component, the solvent system or even the casting solution.

In the subsequent step, the casting solution is formed into a film having a first major surface and a second major surface in a forming tool having a temperature above the critical demixing temperature of the casting solution. As forming tool, conventional dies as sheeting dies, casting boxes, casting moulds, doctor blades, profiled dies, or annular-slit dies may be used for this purpose. Preferably, the forming tool is conditioned to a temperature in the range of from 200 to 240° C., preferably in the range of from 200 to 230° C. It is understood that the temperature of the forming tool has a direct effect on the temperature of the casting solution, i.e. the temperature of the casting solution in the forming tool may assume a temperature close or even equal to the temperature of the forming tool.

After forming of the film in the forming tool, the second major surface of the film is placed onto a conditionable carrier, which is conditioned to a cooling temperature below the solidification temperature, resulting in cooling of the film via the conditionable carrier at such a rate that a thermodynamic non-equilibrium liquid-liquid phase separation into a polymer-rich and a polymer-poor phase takes place, and subsequently, on passing below the solidification temperature, solidification of the polymer-rich phase takes place, forming a membrane structure. The conditionable carrier may comprise a solid substance or a solid surface, e.g. in the form of a glass or metal plate. The conditionable carrier preferably has a high thermal conductivity and especially preferably comprises or consists of a metallic material. Preferably, the conditionable carrier is an appropriately conditioned roller, preferably having a metal surface, preferably is a tempered chill roll, or an appropriately conditioned belt. The temperature of the conditionable carrier directly influences the porous structure of the flat-sheet membrane. Generally, the conditionable carrier is conditioned to a temperature in the range of from 5 to 45° C. Preferably, the conditionable carrier is conditioned to a temperature in the range of from 5 to 30° C., preferably in the range of from 10 to 20° C. Temperatures outside these ranges will have the effect that the membrane structure according to the membranes as described herein may not be obtained, resulting in membranes not having the desired combination of properties. In this regard, it is also preferred that difference of forming tool temperature and the temperature of the conditionable carrier is is in the range of from 150 to 250° C., preferably from 155 to 245° C.

At the same time as the second major surface of the film is place onto the conditionable carrier, the first major surface is brought into contact with a gaseous atmosphere. The gaseous atmosphere may comprise air, at least one inert gas such as nitrogen or argon, or a mixture thereof, and my further comprise water vapour. Generally, the gaseous atmosphere may have ambient temperature.

In a subsequent step, the film is placed into a precipitation bath comprising a non-solvent for the polyamide polymer, thereby finalizing and fixing the three-dimensioned porous membrane structure. With regard to the non-solvent for the polyamide, it is preferred that the precipitation bath comprises water, preferably at least 95% water. Water is particularly advantageous since it is definitely a non-solvent for polyamide, is non-toxic, almost always available, generally free from fire and environmental hazards, and may be conditioned to suitable temperatures. Preferably, the precipitation bath is tempered to a temperature in the range of from 5 to 50° C., preferably from 10 to 40° C., more preferably from 10 to 35° C. With temperatures in these ranges, finalizing and, in particular, fixing the three-dimensioned porous membrane structure may be achieved.

In the method as described herein, the film has a residence time on the conditionable carrier from being casted onto the conditionable carrier until entry into the precipitation bath of at least 10 s. That is, during this residence time the second major surface of the film is exposed to the temperature of the conditionable carrier and the first major surface of the film is exposed to the gaseous atmosphere, preferably having ambient temperature. Due to the different heat capacities and/or different temperatures and/or different surface of conditionable carrier and gaseous atmosphere, the unique structure of the membranes according to the present disclosure may be obtained, in particular with regard to differences in pore sizes of first and major surfaces and the proximity of the separation layer to the second major surface. In this regard, it is preferred that the residence time is at least 15 s, preferably at least 20 s. It is further preferred that the residence time is in the range of from 10 to 50 s, preferably from 15 to 40 s, and more preferably from 20 to 30 s.

Preferably, the method according to the present disclosure comprises an additional step (vi) subjecting the membrane obtained in step (v) to an extracting step to remove residual solvents and additives. Preferably, this extracting step comprises subjecting the membrane to at least one extraction bath. For practical reason, it is preferred that the at least one extraction bath comprises water. Preferably, the at least one extraction bath is tempered a temperature in the range of 50 to 150° C., preferably in the range of from 65 to 120° C., more preferably in the range of from 75 to 105° C.

Similarly, it is preferred that the method as described herein comprises a further step (vii) drying the membrane. Drying has the common meaning in the art, i.e. the removal of solvent, in particular water, from the membrane surfaces and/or the membrane pores. Preferably, drying in step (vii) comprises exposing the membrane to air having a temperature in the range of from 25 to 120° C., preferably in the range of from 35 to 105° C., and more preferably in the range of from 45 to 95° C. Means and methods for drying membranes, in particular flat-sheet membranes by exposing the membrane to air having temperatures in the preferred ranges, are known in the art to the skilled person.

The method as described herein may also include further steps for modifying the membrane, such as stretching, relaxation and the like. Stretching may have an impact on the pore sizes and porous structure of the membrane, which also may influence the transmembrane flow and/or dmax. Relaxation may further help to stabilize the membrane, e.g. by avoiding shrinkage and the like during transport or winding onto a roll.

Due to the unique combination of properties of the membranes as described herein, preferably obtained from the method as described herein, the present disclosure further provides a use of the membranes as described herein for nanofiltration or ultrafiltration. "Nanofiltration" and "ultrafiltration" have the meaning common in the art. Preferably, the use as described herein comprises purification of liquid media, in particular aqueous media. Further preferred is the use comprising purification of liquid media, in particular aqueous media or water in semiconductor producing processes.

Figure 1:
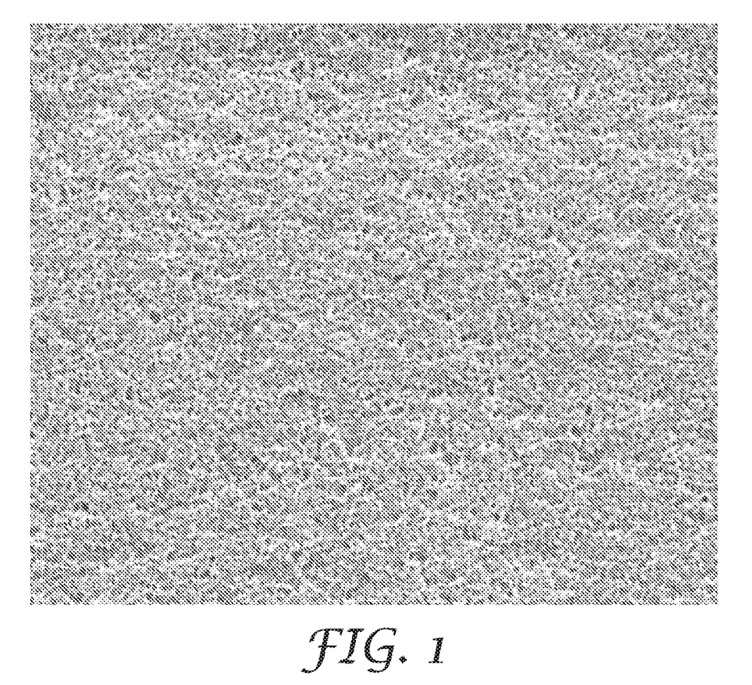
FIG. 1: SEM picture of 8000× magnification of the second major surface of a membrane according to the present disclosure.
Figure 2:
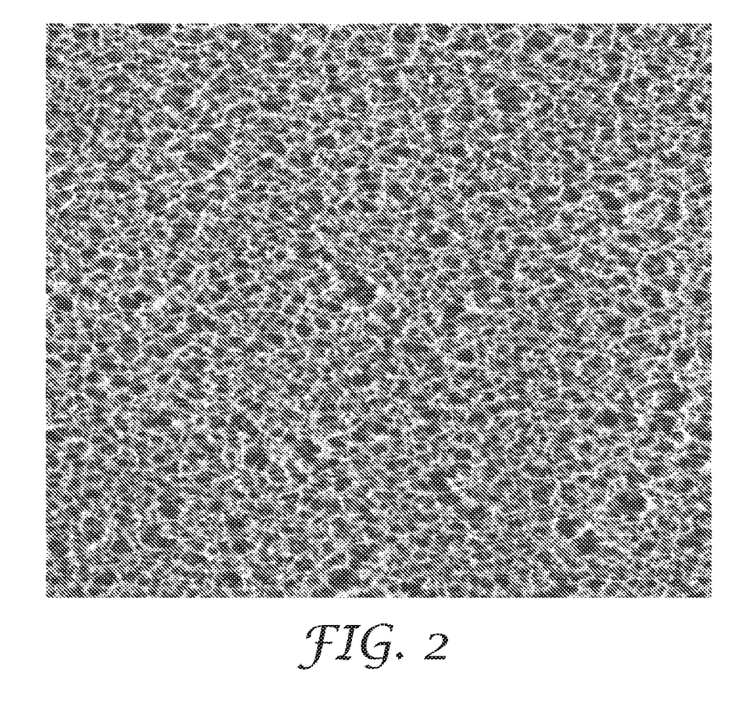
FIG. 2: SEM picture of 2000× magnification of the first major surface of a membrane according to the present disclosure.
Figure 3:
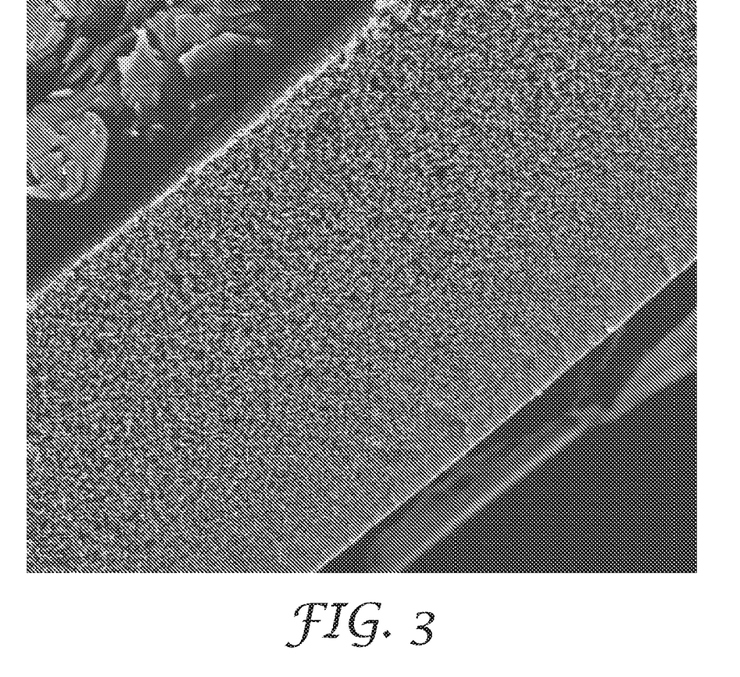
FIG. 3: SEM picture of 1000× magnification of a cross-section of a membrane according to the present disclosure
Figure 4:
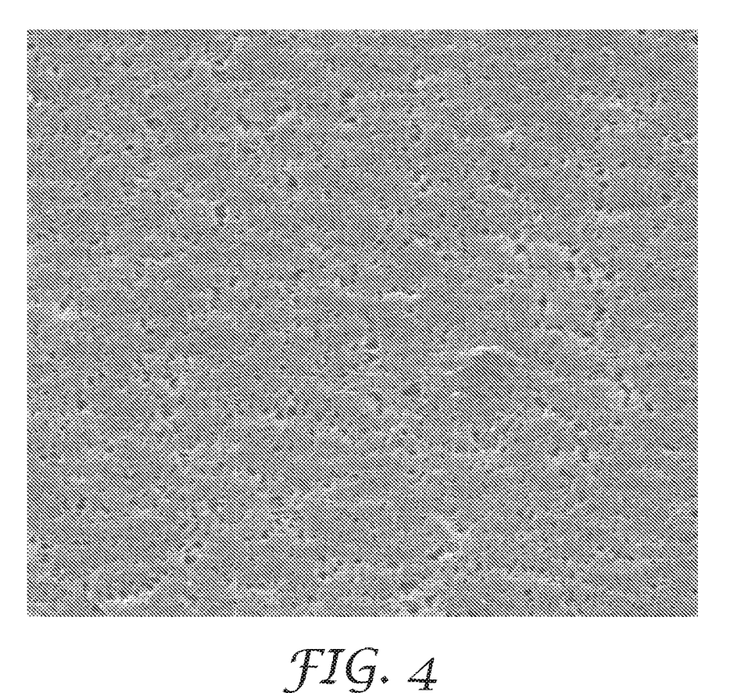
FIG. 4: SEM picture of 8000× magnification of the second major surface of the membrane obtained in comparative ex. 1.
Figure 5:
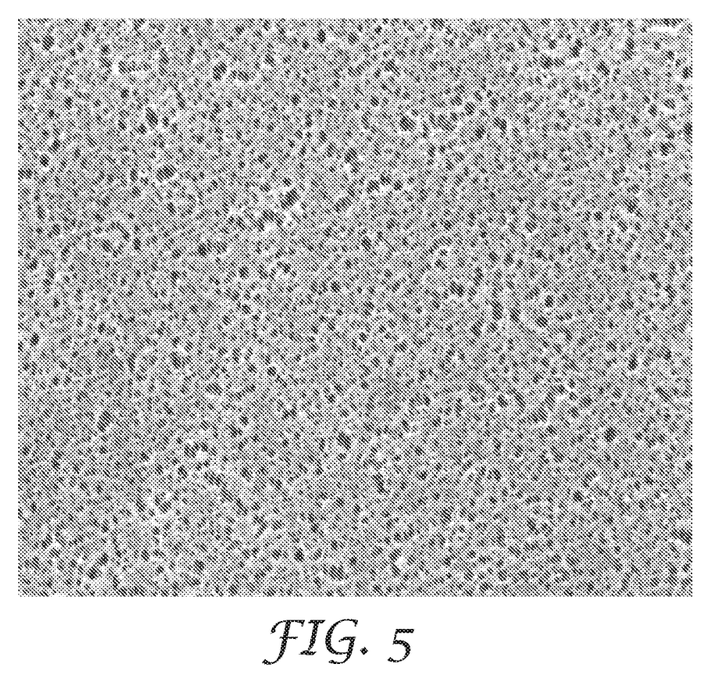
FIG. 5: SEM picture of 2000× magnification of the first major surface of the membrane obtained in comp. ex. 1.
Figure 6:
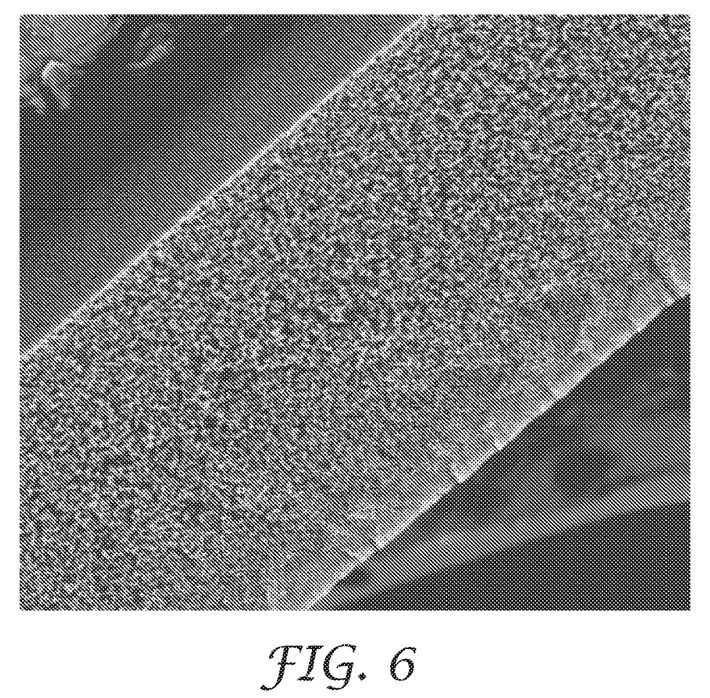
FIG. 6: SEM picture of 1000× magnification of a cross-section of the membrane obtained in comp. ex. 1.

The present disclosure may further be exemplified by the following items:

1. A flat-sheet polyamide membrane comprising a first major surface and a second major surface and a separation layer and a porous substructure in the cross section of the membrane between the first major and the second major surface, wherein the average pore size diameter in the separation layer is smaller than the average pore size diameters on the first and second major surfaces, wherein the average pore size diameter on the first major surface is larger than the average pore size diameter on the second major surface, wherein the separation layer is closer to the second major surface than to the first major surface.
2. The membrane according to item 1, wherein the maximum of the pore size distribution in the separation layer according to ASTM F316-03 is in the range of from 5 to 50 nm.
3. The membrane according to item 1 or 2, wherein the maximum of the pore size distribution in the separation layer according to ASTM F316-03 are in the range of from 20 to 50 nm.
4. The membrane according to any one of items 1 to 3, wherein the maximum of the pore size distribution in the separation layer according to ASTM F316-03 is in the range of from 30 to 45 nm, more preferably in the range of from 30 to 40 nm.
5. The membrane according to any one of the preceding items, wherein the membrane is substantially free from macrovoids.
6. The membrane according to any one of the preceding items, wherein the surface porosity on the first major surface is larger than the surface porosity on the second major surface.

7. The membrane according to item 6, wherein the membrane has a surface porosity on the first major surface of at least 20%, preferably of at least 25%, and more preferably of at least 30%.
8. The membrane according to item 6, wherein the membrane has a surface porosity on the second major surface of at least 15%, preferably of at least 20%.
9. The membrane according to any one of the preceding items, wherein the ratio of the average pore diameters on the second major surface to the average pore diameters on the first major surface is at least 1:3, preferably at least 1:5, more preferably at least 1:7.
10. The membrane according to item 9, wherein the ratio of the average pore diameters on the second major surface to the average pore diameters on the first major surface is less than 1:10, preferably less than 1:9, more preferably less than 1:8.
11. The membrane according to any one of the preceding items, wherein the average pore diameter on the first major surface is at least 0.5 μm, preferably at least 0.7 μm, and more preferably at least 1 μm.
12. The membrane according to any one of the preceding items, wherein the average pore diameter on the second major surface is at least 0.05 μm, preferably at least 0.1 μm, more preferably at least 0.15 μm.
13. The membrane according to any one of the preceding items, wherein the membrane exhibits a dmax as determined with bubble point IPA of at least 0.01 μm, preferably of at least 0.02 μm, more preferably of at least 0.03 μm.
14. The membrane according to any one of the preceding items, wherein the membrane exhibits a dmax as determined with bubble point IPA of less than 0.12 μm, preferably of less than 0.1 μm, and more preferably of less than 0.09 μm.
15. The membrane according to any one of the preceding items, wherein the transmembrane flow is in the range of from 0.1 to 10 mL/(min·cm²·bar), preferably in the range of from 0.5 to 8 mL/(min·cm²·bar), more preferably in the range of from 1 to 3 mL/(min·cm²·bar).
16. The membrane according to any one of items 1 to 14, wherein the transmembrane flow is in the range of from 1 to 5 mL/(min·cm²·bar).
17. The membrane according to any one of items 1 to 14, wherein the transmembrane flow is in the range of from 0.5 to 3 mL/(min·cm²·bar).
18. The membrane according to any one of items 1 to 14, wherein the transmembrane flow is in the range of from 0.1 to 2 mL/(min·cm²·bar).
19. The membrane according to any one of the preceding items, wherein the wall, starting from the separation layer in direction to the first major surface, comprises an asymmetric region over at least 80% of the wall thickness.
20. The membrane according to any one of the preceding items, wherein the membrane comprises a volume porosity in the range of from 70 to 90%.
21. The membrane according to any one of the preceding items, wherein the polyamide is selected from polyamide-6, polyamide-6,6, polyamide-6,1 or polyamide-4,6, polyamide-11 or polyamide-12, and polyamide copolymers, and any combination and mixtures thereof.
22. The membrane according to any one of the preceding items, wherein the polyamide has a number average molecular weight in the range of from 20000 and 60000 Daltons.
23. The membrane according to any one of the preceding items, wherein the membrane exhibits a thickness in the range of from 100 to 300 μm.
24. The membrane according to any one of the preceding items, wherein the membrane exhibits a thickness in the range of from 200 to 300 μm.
25. A method for producing a membrane, comprising the steps
(i) Providing a homogeneous casting solution comprising a polyamide and a solvent system, wherein the casting solution of the polymer component and solvent system has on cooling a critical demixing temperature and a solidification temperature, and a miscibility gap below the critical demixing temperature in the liquid state of aggregation, and wherein the solvent system contains a component A and a component B, which are liquid and can be mixed homogeneously with each other at the dissolving temperature, and wherein a solvent for the polymer component is selected from component A and component B is a non-solvent for the polymer component;
(ii) Forming of the casting solution into a film having a first major surface and a second major surface in a forming tool having a temperature above the critical demixing temperature of the casting solution;
(iii) Placing the second major of the film onto a conditionable carrier, which is conditioned to a cooling temperature below the solidification temperature, resulting in cooling of the film via the conditionable carrier at such a rate that a thermodynamic non-equilibrium liquid-liquid phase separation into a polymer-rich and a polymer-poor phase takes place, and subsequently, on passing below the solidification temperature, solidification of the polymer-rich phase takes place, forming a membrane structure; at the same time;
(iv) Bringing the first major surface of the film into contact with a gaseous atmosphere,
(v) Placing the film into a precipitation bath comprising a non-solvent for the polyamide polymer, thereby forming the three-dimensioned porous membrane structure, characterized in that
the conditionable carrier is conditioned to a temperature in the range of from 5 to 45° C.;
and wherein the film has a residence time on the conditionable carrier from being casted onto the conditionable carrier until entry into the precipitation bath of at least 10 s.
26. The method according to item 25, wherein the conditionable carrier is conditioned to a temperature in the range of from 5 to 30° C., preferably in the range of from 10 to 20° C.
27. The method according to item 25 or 26, wherein the casting solution comprises the polyamide in an amount of from 10 to 25 wt.-%, preferably from 10 to 17 wt.-%, more preferably from 12 to 15 wt.-%.
28. The method according to any one of items 25 to 27, wherein the residence time of the film on the conditionable carrier is at least 15 s, and preferably at least 20 s.
29. The method according to any one of items 25 to 27, wherein the residence time is in the range of from 10 to 50 s, preferably from 15 to 40 s, more preferably from 20 to 30 s.
30. The method according to any one of items 25 to 30, wherein the precipitation bath is tempered to a temperature in the range of from 5 to 50° C., preferably from 10 to 40° C., more preferably from 10 to 35° C.
31. The method according to any one of items 25 to 30, wherein the precipitation bath comprises water, preferably at least 95% water.
32. The method according to any one of items 25 to 31, wherein the forming tool exhibits a temperature in the range of from 200 to 240° C., preferably in the range of from 200 to 230° C.
33. The method according to any one of items 25 to 32, wherein the forming tool is selected from sheeting dies, casting boxes, casting moulds, doctor blades, profiled dies, and annular-slit dies.
34. The method according to any one of items 25 to 33, wherein the conditionable carrier comprises a solid substance or a solid surface, preferably in the form of a glass or metal plate.
35. The method according to item 34, wherein the conditionable carrier comprises or consists of a metallic material.
36. The method according to item 34 or item 35, wherein the conditionable carrier is an appropriately conditioned roller, preferably having a metal surface, preferably is a tempered chill roll, or an appropriately conditioned belt.
37. The method according to any one of items 25 to 36, wherein the difference of forming tool temperature and the temperature of the conditionable carrier is in the range of from 150 to 250° C., preferably from 155 to 245° C.
38. The method according to any one of items 25 to 37, wherein the at least one component (B) is a solvent which does dissolve the polyamide, but of which the dissolving temperature relative to the polyamide is at least 50° C., preferably 100° C. higher than the dissolving temperature component (A) to the polyamide.
39. The method according to any one of items 25 to 38, wherein the at least one component (A) is selected from diglycerol, glycerol, glycol, diglycol, glyceryl monoacetate, caprolactam or butyrolactone and any combinations and mixtures thereof.
40. The method according to any one of items 25 to 39, wherein the at least one component (B) is selected from polyethylene glycols.
41. The method according to any one of items 25 to 40, wherein the solvent system is water soluble.
42. The method according to any one of items 25 to 41, wherein the at least one component (A) is diglycerine and the at least one component (B) is a polyethylene glycol, preferably polyethylene glycol 600.
43. The method according to any one of items 25 to 42, wherein the ratio of at least one component (A) to at least one component (B) in the solvent system is greater than 50:1, preferably greater than 70:1, more preferably greater than 90:1, even more preferably greater than 99:1.
44. The method according to any one of items 25 to 43, comprising an additional step (vi) subjecting the membrane obtained in step (v) to an extracting step to remove residual solvents and additives.
45. The method according to any item 44, wherein the extracting step (vi) comprises subjecting the membrane to at least one extraction bath.
46. The method according to item 45, wherein the extraction bath contains water.
47. The method according to any one of items 44 to 46 wherein the at least one extraction bath is conditioned to a temperature in the range of 50 to 150° C., preferably in the range of from 65 to 120° C., more preferably in the range of from 75 to 105° C.
48. The method according to any one of items 25 to 47, comprising an additional step (vii) drying the membrane.
49. The method according to item 48, wherein drying in step (vii) comprises exposing the membrane to air having a temperature in the range of from 25 to 120° C., preferably in the range of from 35 to 105° C., more preferably in the range of from 45 to 95° C.
50. The method according to any one of items 25 to 49, further comprising at least one additional step selected from tempering, stretching and relaxation.
51. A polyamide membrane, obtainable according to the method according to any one of items 25 to 51.
52. Use of the polyamide membrane according to any one of items 1 to 24 or according to item 51 for nanofiltration or ultrafiltration.
53. Use according to item 52, wherein the use comprises purification of liquid media, preferably aqueous media.
54. Use according to item 52 or 53, wherein the use comprises purification of liquid media, preferably aqueous media or water in semiconductor producing processes.

EXAMPLES

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated.

Test Methods

Relative Solution Viscosity

In order to determine the relative solution viscosity, 250 mg of the polymer or membrane were dissolved in 25 ml of 90% formic acid at room temperature and with stirring, over a period of 1 hour. Using an Ubbelohde viscometer of type I-C (constant: 0.03188), the flow times in seconds of the polymer solution and of the solvent (formic acid) were determined at a measurement temperature of 25° C. The relative viscosity SV was then determined from the equation $$SV = \frac{\text{flow time of the polymer solution}}{\text{flow time of the solvent}(90\%\text{ formic acid})}$$

Volume Porosity:

A sample of at least 0.5 g of the membrane to be examined is dry weighed. The membrane sample is subsequently placed in a liquid that moistens the membrane material, however without causing swelling, for 24 hours such that the liquid penetrates into all pores. For the present polyamide membranes, a silicone oil with a viscosity of 200 mPa s at 25° C. (Merck) is used. The permeation of liquid into the membrane pores is visually discernable in that the membrane sample changes from an opaque to a glassy, transparent state. The membrane sample is subsequently removed from the liquid, liquid adhering to the membrane sample is removed by centrifuging at approx. 1800 g, and the mass of the thus pretreated wet, i.e. liquid-filled, membrane sample is determined by weighing.

The volume porosity ε is determined according to the following formula:

$$\text{Volume porosity } \varepsilon = \frac{(m_{wet} - m_{dry})/\rho_{liquid}}{(m_{wet} - m_{dry})/\rho_{liquid} + m_{dry}/\rho_{polymer}}$$

where:
Vw=volume of water [ml] flowing through the membrane sample during the measuring period
Δt=measuring time [min]
$A_M$=area of the membrane sample penetrated (43.2 cm²)
Δp=pressure set during the measurement [bar]

Maximum Separating Pore:

The diameter of the maximum separating pore is determined by means of the bubble point method (ASTM No. 128-99 and F 316-03), for which the method described in DE-A-36 17 724 is suitable. Thereby, $d_{max}$ results from the vapor pressure $P_B$ associated with the bubble point according to the equation $$d_{max} = \sigma_B/P_B$$

where $\sigma_B$ is a constant that is primarily dependent on the wetting liquid used during the measurement. For IPA, $\sigma_B$ is 0.61 μm·bar at 25° C.

Determination of the Transmembrane Flow (Water Permeability):

Disc-shaped membrane samples are stamped out of the membrane to be tested and then clamped fluid-tight at the perimeter in a suitable sample holder such that a free measuring area of 43.2 cm² results. The sample holder is located in a housing that can be penetrated under pressure by water. The clamped membrane sample is then penetrated, from the side on which the surface of the membrane with the smaller pores is located, by deionized water conditioned to 25° C. at a defined pressure between 0.1 and 0.2 bar. The water volume that flows through the membrane sample during a measuring period of 60 s is determined gravimetrically or volumetrically.

The transmembrane flow, TMF, is determined according to formula (III)

$$TMF\left[\frac{l}{m^2 \cdot h \cdot bar}\right] = \frac{V_w}{\Delta t \cdot A_M \cdot \Delta p} \cdot 600 \quad (III)$$

where:
Vw=volume of water [ml] flowing through the membrane sample during the measuring period
Δt=measuring time [min]
$A_M$=area of the membrane sample penetrated (43.2 cm²)
Δp=pressure set during the measurement [bar]

Force and Elongation at Break:

Measuring the force at break of the membrane takes place using a standard, universal testing machine from Zwick (Ulm, Germany). For this purpose, samples are cut from the flat membrane to be tested, the edges thereof oriented in the production direction and transverse to the production direction. The samples have a width of 15 mm and are clamped in the testing machine such that a free length of 25 cm results.

The membrane samples are stretched at constant speed in the longitudinal direction or in the transverse direction of the samples until break. The force required for this is measured as a function of the change in length and retained in a force/elongation curve. The measurement takes place as multiple determinations on five membrane samples at 100 mm clamping length and at a traction speed of 500 mm/min. The pretension weight is 2.5 cN. The measurement is performed at room temperature.

The force required for breaking, BK, is determined as the average numeric value in cN and the elongation at rupture achieved thereby as a % of the original length. The breaking strength GB of the membrane sample in cN/mm² is obtained by standardizing the breaking force BK to the cross-sectional area $A_Q$ of the membrane wall, which results from the sample width and the membrane thickness.

Example 1

A homogeneous solution of polyamide-6 of type AKULON F 136E (from DSM) with addition of the antioxidant agent Irganox® 1098 (from Ciba Specialty Chemicals) was prepared in a solvent system consisting of diglycerol and polyethylene glycol PEG 600 in the ratio 99:1. To keep degradation of the polyamide to a minimum, care was taken to work under the most protective conditions possible in regard to residence times and temperatures, and to use essentially anhydrous starting materials.

From AKULON F 136E granulate and 0.4% by weight, relative to the polyamide, of the antioxidant agent Irganox® 1098, a dry blend was first prepared by coating the Irganox® 1098 powder on the polymer granulate. The dry blend was melted in an extruder at approx. 240-250° C. and dosed by means of a gear pump into a low-volume mixer, heated to 190° C., with high shearing action. The solvent system, conditioned to 170° C., was simultaneously dosed into the mixer, the dosing settings for the polyamide melt and the solvent system being so chosen that a polymer solution containing approx. 13% by weight of polyamide was obtained.

The homogeneous polyamide solution exiting from the mixer was filtered, fed by means of a solution pump to a casting mould heated to approx. 200° C. and then spread out, with a film thickness of approx. 170 μm, to a shaped object on a casting roller conditioned to approx. 16° C., at the same time exposed to an atmosphere of air at ambient temperature. After being passed through an air section, the shaped object was immersed in a cooling bath containing water at 30° C. to obtain the final membrane structure. The polyamide flat membrane so formed was washed with deionised water at 90° C., slightly drawn, and then dried on a drum dryer and fixed.

The membrane obtained had a microporous, sponge-like pore structure and was spontaneously wettable with water. The properties of the membrane are summarized in table 1.

Comparative Example 1

A homogeneous solution of polyamide-6 of type AKULON F 136E (from DSM) with addition of the antioxidant agent Irganox® 1098 (from Ciba Specialty Chemicals) was prepared in a solvent system consisting of diglycerol and polyethylene glycol PEG 600 in the ratio 95:5. To keep degradation of the polyamide to a minimum, care was taken to work under the most protective conditions possible in regard to residence times and temperatures, and to use essentially anhydrous starting materials.

From AKULON F 136E granulate and 0.4% by weight, relative to the polyamide, of the antioxidant agent Irganox® 1098, a dry blend was first prepared by coating the Irganox® 1098 powder on the polymer granulate. The dry blend was melted in an extruder at approx. 240-250° C. and dosed by means of a gear pump into a low-volume mixer, heated to 190° C., with high shearing action. The solvent system, conditioned to 170° C., was simultaneously dosed into the mixer, the dosing settings for the polyamide melt and the solvent system being so chosen that a polymer solution containing approx. 22% by weight of polyamide was obtained.

The homogeneous polyamide solution exiting from the mixer was filtered, fed by means of a solution pump to a casting mould heated to approx. 200° C. and then spread out, with a film thickness of approx. 140 μm, to a shaped object on a casting roller conditioned to approx. 75° C. After being passed through an air section, the shaped object was immersed in a cooling bath containing warm water at 75° C. to obtain the final membrane structure. The polyamide flat membrane so formed was washed with deionised water at 90° C., slightly drawn, and then dried on a drum dryer and fixed.

The membrane obtained had a microporous, sponge-like pore structure and was spontaneously wettable with water. The properties of the membrane are summarized in table 1.

|  | Ex. 1 | Comp. Ex. 1 |
|---|---|---|
| Bubble point [bar] | 7.25 | 3.07 |
| dmax [μm] | 0.085 | 0.235 |
| TMF | 1.8 | 15.1 |
| Volume porosity [%] | 80.99 | 83.02 |
| Surface porosity [%] | 2$^{nd}$ surface: 26.49 | 11.24 |
|  | 1$^{st}$ surface: 41.11 | 12.44 |
| Average pore diameter [μm] | 2$^{nd}$ surface: 0.16 | 0.14 |
|  | 1$^{st}$ surface: 1.14 | 0.6 |
| Thickness [μm] | 170 | 150 |
| Breaking strength [cN] (longitudinal direction) | 1063.6 | 669.1 |
| Breaking strength [cN] (transversal direction) | 633.5 | 564.1 |
| Elongation at break [%] (longitudinal direction) | 59 | 64.2 |
| Elongation at break [%] (longitudinal direction) | 88.1 | 73.5 |

The invention claimed is:

1. A flat-sheet polyamide membrane comprising a first major surface and a second major surface, a separation layer located between the first and the second major surfaces, and a porous substructure in the cross section of the membrane between the first major and the second major surface; wherein the average pore size diameter in the separation layer is smaller than the average pore size diameters on the first and second major surfaces, wherein the average pore size diameter on the first major surface is larger than the average pore size diameter on the second major surface, wherein the separation layer is closer to the second major surface than to the first major surface; and wherein the first and second major surfaces have a filamentous network-like structure.

2. The membrane according to claim 1, wherein the maximum of the pore size distribution in the separation layer according to ASTM F316-03 is in the range of from 5 to 50 nm.

3. The membrane according to claim 1, wherein the surface porosity on the first major surface is larger than the surface porosity on the second major surface.

4. The membrane according to claim 1, wherein the membrane has a surface porosity on the first major surface of at least 20%.

5. The membrane according to claim 1, wherein the membrane exhibits a dmax as determined with bubble point IPA of at least 0.01 μm.

6. The membrane according to claim 1, wherein the transmembrane flow is in the range of from 0.1 to 10 mL/(min·cm2·bar).

7. A method for producing a membrane according to claim 1, comprising the steps
   (i) providing a homogeneous casting solution comprising a polyamide and a solvent system, wherein the casting solution of the polymer component and solvent system has on cooling a critical demixing temperature and a solidification temperature, and a miscibility gap below the critical demixing temperature in the liquid state of aggregation, and wherein the solvent system contains a component A and a component B, which are liquid and can be mixed homogeneously with each other at the dissolving temperature, and wherein a solvent for the polymer component is selected from component A and component B is a non-solvent for the polymer component;
   (ii) forming of the casting solution into a film having a first major surface and a second major surface in a forming tool having a temperature above the critical demixing temperature of the casting solution;
   (iii) placing the second major of the film onto a conditionable carrier, which is conditioned to a cooling temperature below the solidification temperature, resulting in cooling of the film via the conditionable carrier at such a rate that a thermodynamic non-equilibrium liquid-liquid phase separation into a polymer-rich and a polymer-poor phase takes place, and subsequently, on passing below the solidification temperature, solidification of the polymer-rich phase takes place, forming a membrane structure; at the same time;
   (iv) bringing the first major surface of the film into contact with a gaseous atmosphere,
   (v) placing the film into a precipitation bath comprising a non-solvent for the polyamide polymer, thereby forming the three-dimensioned porous membrane structure, characterized in that
   the conditionable carrier is conditioned to a temperature in the range of from 5 to 45° C.; and wherein the film has a residence time on the conditionable carrier from being casted onto the conditionable carrier until entry into the precipitation bath of at least 10 s.

8. The method according to claim 7, wherein the conditionable carrier is conditioned to a temperature in the range of from 5 to 30° C.

9. The method according to claim 7, wherein the casting solution comprises the polyamide in an amount of from 10 to 25 wt. %.

10. The method according to claim 7, wherein the residence time of the film on the conditionable carrier is at least 15 s.

11. The method according to claim 7, wherein the residence time is in the range of from 20 to 30 s.

12. The method according to claim 7, wherein the forming tool exhibits a temperature in the range of from 200 to 240° C.

13. The method according to claim 7, wherein a difference of the forming tool temperature and the temperature of the conditionable carrier is in the range of from 150 to 250° C.

* * * * *

UNITED STATES PATENT AND TRADEMARK OFFICE
CERTIFICATE OF CORRECTION

PATENT NO. : 11,130,099 B2
APPLICATION NO. : 16/624588
DATED : September 28, 2021
INVENTOR(S) : Malek et al.

It is certified that error appears in the above-identified patent and that said Letters Patent is hereby corrected as shown below:

In the Claims

Column 18

Line 6, In Claim 6, delete "(min cm2 bar)" and insert -- (min $cm^2$ bar) --, therefor.

Line 52 (approx.), In Claim 9, delete "wt. %" and insert -- wt.-% --, therefor.

Signed and Sealed this
Tenth Day of May, 2022

Katherine Kelly Vidal
*Director of the United States Patent and Trademark Office*